United States Patent
Diard

(10) Patent No.: US 9,324,174 B2
(45) Date of Patent: *Apr. 26, 2016

(54) MULTI-CHIP RENDERING WITH STATE CONTROL

(75) Inventor: Franck R. Diard, Mountain View, CA (US)

(73) Assignee: NVIDIA Corporation, Santa Clara, CA (US)

(*) Notice: Subject to any disclaimer, the term of this patent is extended or adjusted under 35 U.S.C. 154(b) by 535 days.

This patent is subject to a terminal disclaimer.

(21) Appl. No.: 12/624,428

(22) Filed: Nov. 24, 2009

(65) Prior Publication Data

US 2010/0066747 A1 Mar. 18, 2010

Related U.S. Application Data

(63) Continuation of application No. 11/264,828, filed on Oct. 31, 2005, now Pat. No. 7,629,978.

(51) Int. Cl.
| | | |
|---|---|---|
| *G06F 13/14* | (2006.01) | |
| *G06F 15/16* | (2006.01) | |
| *G06T 1/20* | (2006.01) | |
| *G06T 15/00* | (2011.01) | |
| *G06F 9/30* | (2006.01) | |
| *G06F 9/38* | (2006.01) | |

(Continued)

(52) U.S. Cl.
CPC .......... *G06T 15/005* (2013.01); *G06F 9/30069* (2013.01); *G06F 9/30072* (2013.01); *G06F 9/3879* (2013.01); *G06F 9/3885* (2013.01); *G06F 3/1438* (2013.01); *G06F 9/505* (2013.01)

(58) Field of Classification Search
CPC ......... G06T 1/20; G06T 15/005; G09F 5/363; G06F 9/3879; G06F 9/30069; G06F 9/30072; G06F 9/3885; G06F 9/505; G06F 3/1438
USPC .......................... 345/501–506, 522, 537, 562; 712/E9.05, E9.071, E9.08
See application file for complete search history.

(56) References Cited

U.S. PATENT DOCUMENTS

| | | | |
|---|---|---|---|
| 4,967,392 A | | 10/1990 | Werner et al. |
| 5,293,480 A | * | 3/1994 | Miller et al. .................. 345/502 |
| 5,450,550 A | | 9/1995 | Ito et al. |

(Continued)

FOREIGN PATENT DOCUMENTS

EP  0571969 A2  1/1993

OTHER PUBLICATIONS

Molnar, Steven et al.; "PixelFlow: High-Speed Rendering Using Image Composition"; 1992, *Computer Graphics*, vol. 26, No. 2, pp. 231-240.

(Continued)

*Primary Examiner* — Jin-Cheng Wang
(74) *Attorney, Agent, or Firm* — Artegis Law Group, LLP

(57) ABSTRACT

Circuits, methods, and apparatus that provide multiple graphics processor systems where specific graphics processors can be instructed to not perform certain rendering operations while continuing to receive state updates, where the state updates are included in the rendering commands for these rendering operations. One embodiment provides commands instructing a graphics processor to start or stop rendering geometries. These commands can be directed to one or more specific processors by use of a set-subsystem device mask.

17 Claims, 15 Drawing Sheets

(51) Int. Cl.
*G06F 3/14* (2006.01)
*G06F 9/50* (2006.01)

(56) References Cited

U.S. PATENT DOCUMENTS

| | | | |
|---|---|---|---|
| 5,790,130 | A | 8/1998 | Gannett |
| 5,841,444 | A | 11/1998 | Mun et al. |
| 6,023,281 | A | 2/2000 | Grigor et al. |
| 6,078,339 | A * | 6/2000 | Meinerth et al. ............. 345/522 |
| 6,191,800 | B1 | 2/2001 | Arenburg et al. |
| 6,259,461 | B1 | 7/2001 | Brown |
| 6,266,072 | B1 | 7/2001 | Koga et al. |
| 6,317,133 | B1 | 11/2001 | Root et al. |
| 6,362,818 | B1 | 3/2002 | Gardiner et al. |
| 6,445,391 | B1 | 9/2002 | Sowizral et al. |
| 6,469,746 | B1 | 10/2002 | Maida |
| 6,473,086 | B1 | 10/2002 | Morein et al. |
| 6,570,571 | B1 * | 5/2003 | Morozumi ............. 345/505 |
| 6,724,390 | B1 | 4/2004 | Dragony et al. |
| 6,747,654 | B1 | 6/2004 | Laksono et al. |
| 6,781,590 | B2 | 8/2004 | Katsura et al. |
| 6,791,553 | B1 | 9/2004 | Lefebvre et al. |
| 6,882,346 | B1 | 4/2005 | Lefebvre et al. |
| 6,952,217 | B1 * | 10/2005 | Diard et al. ............. 345/562 |
| 6,956,579 | B1 * | 10/2005 | Diard et al. ............. 345/537 |
| 7,015,915 | B1 * | 3/2006 | Diard ............. 345/522 |
| 7,075,541 | B2 * | 7/2006 | Diard ............. 345/505 |
| 7,095,416 | B1 | 8/2006 | Johns et al. |
| 7,333,114 | B2 * | 2/2008 | Andrews et al. ............. 345/503 |
| 7,456,833 | B1 | 11/2008 | Diard |
| 7,522,167 | B1 | 4/2009 | Diard et al. |
| 7,629,978 | B1 * | 12/2009 | Diard ............. 345/502 |
| 2003/0128216 | A1 | 7/2003 | Walls et al. |
| 2004/0008200 | A1 * | 1/2004 | Naegle et al. ............. 345/505 |
| 2004/0075623 | A1 | 4/2004 | Hartman |
| 2005/0012749 | A1 | 1/2005 | Gonzalez |
| 2005/0088445 | A1 | 4/2005 | Gonzalez |
| 2005/0190190 | A1 * | 9/2005 | Diard et al. ............. 345/502 |
| 2006/0055701 | A1 * | 3/2006 | Taylor et al. ............. 345/522 |
| 2006/0267992 | A1 * | 11/2006 | Kelley et al. ............. 345/502 |
| 2006/0267993 | A1 | 11/2006 | Hunkins et al. |
| 2006/0271717 | A1 * | 11/2006 | Koduri et al. ............. 710/241 |
| 2007/0279411 | A1 * | 12/2007 | Bakalash et al. ............. 345/419 |
| 2007/0291040 | A1 * | 12/2007 | Bakalash et al. ............. 345/505 |
| 2008/0165197 | A1 * | 7/2008 | Bakalash et al. ............. 345/505 |

OTHER PUBLICATIONS

Whitman, Scott; "Dynamic Load Balancing for Parallel Polygon Rendering"; 1994, *IEEE Computer Graphics and Applications*, vol. 14, No. 4, pp. 41-48.

Computer Graphics, 26, 2, Jul. 1992 "PixelFlow: High-Speed Rendering using Image Composition", by Steven Molnar et al. pp. 231-240.

Graphic Remedy, gDebugger Screen shots, http://www.gremedy.com/screenshots.php, Jul. 23, 2004, p. 1-4.

Justice, Brent, "Nvidia SLI Upgrade Guide", Dec. 13, 2004, http://www.HardOCP.com, p. 1-4.

* cited by examiner

| Command/Data | GPU0 | GPU1 | |
|---|---|---|---|
| SSDM 10 | GPU to ignore following command(s) | GPU to process following command(s) | 400 |
| Turn off geometry pulling | | GPU to not pass geometries to rendering engine | 410 |
| SSDM 01 | GPU to process following command(s) | GPU to ignore following command(s) | 420 |
| Turn on geometry pulling | GPU to pass geometries to rendering engine | | 430 |
| SSDM 11 | GPU to process following command(s) | GPU to process following command(s) | 450 |
| Rendering commands | GPU receives geometries needed by rendering commands, passes them to rendering engine | GPU receives geometries needed by rendering commands, but does not pass them to rendering engine | 460 |

Figure 4

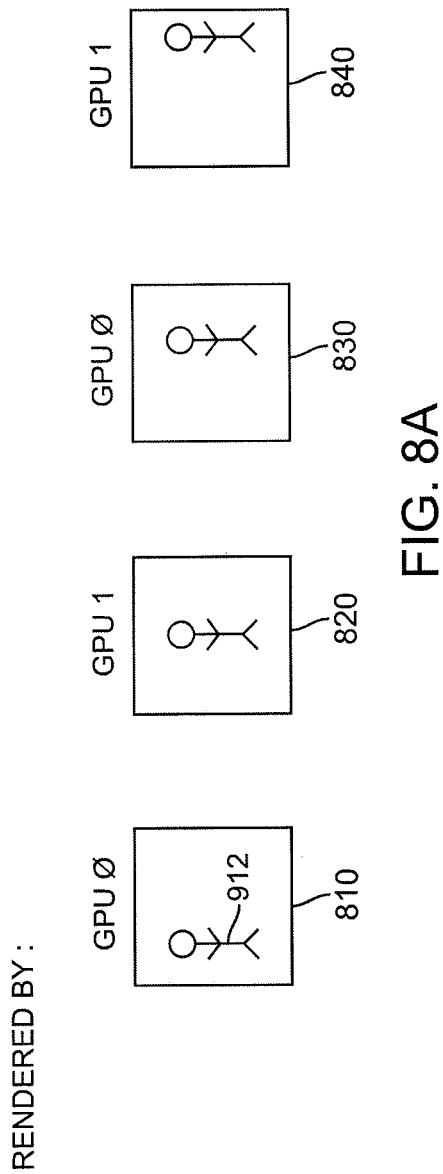

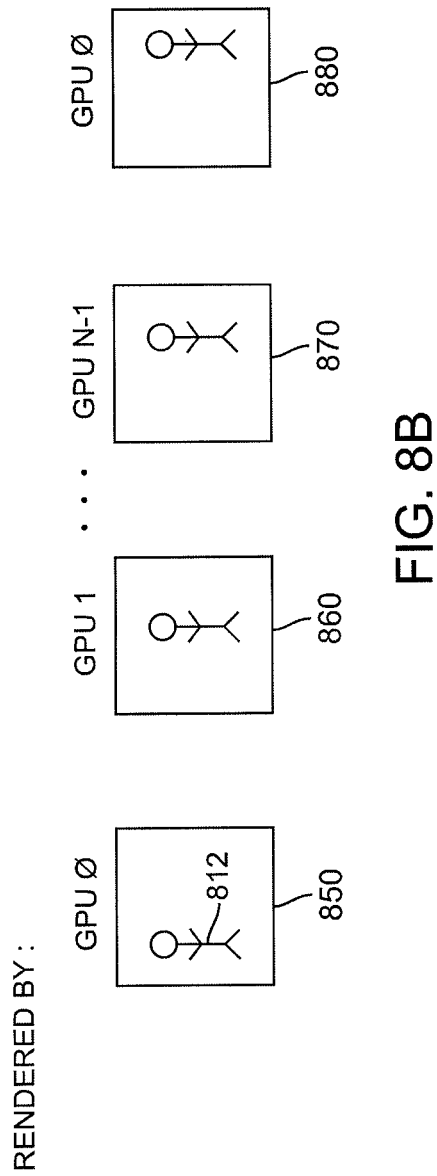

MULTI-CHIP RENDERING WITH STATE CONTROL

CROSS-REFERENCES TO RELATED APPLICATIONS

This application is a continuation of U.S. patent application Ser. No. 11/264,828, filed Oct. 31, 2005, now U.S. Pat. No. 7,629,978, which is incorporated by reference.

BACKGROUND

The present invention relates to reducing redundant geometry rendering while providing state updates to each processor in a multiple graphical processor system.

Graphics processing subsystems are designed to render graphical images for computer, gaming, and other electronic systems. These subsystems typically include a graphics processing unit (GPU), which is a highly complex integrated circuit device optimized to perform graphics computations, and its memory, which is referred to as a graphics memory.

To meet ever increasing demands for realism and speed, some GPUs include more transistors than typical central processing units (CPUs). In addition, graphics memories have become quite large in order to improve system speed by reducing traffic on a system bus; some graphics cards now include as much as 512 MB of memory. But despite these advances, a demand for even greater realism and faster rendering persists.

As one approach to meeting this demand, NVIDIA Corporation of San Jose, Calif., has developed state of the art multi-chip SLI™ graphics processing subsystems, in which two or more GPUs operate in parallel. Parallel operation substantially increases the number of rendering operations that can be carried out.

When multiple processors operate in parallel, it is desirable that each perform a unique set of processing steps. That is, it is desirable that the multiple processors do not perform redundant tasks such as rendering operations. When fewer redundant rendering operations are performed, the efficiency of each processor is increased and the benefits that come from using multiple processors is realized to a greater extent.

These rendering operations are controlled by the receipt of rendering commands. Some rendering commands contain information regarding the state of the image, these may be referred to as state updates. State updates include changes in point of view, lighting, and the like. It is important that each processor in a multiple graphics processing system receive these updates.

Accordingly, it is desirable to prevent redundant geometry rendering while ensuring that each processor in a multiple graphics processor system receive necessary state updates.

SUMMARY

Accordingly, embodiments of the present invention provide circuits, methods, and apparatus where graphics processors in multiple graphics processor systems can be instructed to not perform specific rendering operations while continuing to receive state updates, where state updates are included in rendering commands for the rendering operations.

An exemplary embodiment of the present invention provides a combination of two types of commands or instructions that may be used to allow GPUs to avoid unnecessary geometry rendering while continuing to receive state updates. The first type of command instructs GPUs in a multiple GPU system to either ignore or execute one or more subsequent commands. This command can be referred to as a SetSubDeviceMask (SSDM).

The second type of commands are instructions to either stop or start pulling geometries. When a stop geometry pulling command is executed by a GPU, the GPU retrieves geometries called by rendering commands, but does not pass them to its rendering engine and 3-D pipeline. Turning off geometry pulling allows a GPU to receive state update information contained in rendering commands and associated geometries, while saving the capacity of its rendering engine and pipeline by not passing geometries to them unnecessarily. When a start geometry command is executed by a GPU, the GPU retrieves geometries called by rendering commands and does pass them to its rendering engine and 3-D pipeline. The SSDM command in conjunction with the stop and start geometry pulling commands allow the status of geometry pulling for each GPU to be controlled on an individual basis.

Thus, the combination allows geometry pulling to be turned on and off for specific GPUs in a system, preventing unnecessary geometry rendering while allowing state updates to be received. The two types of commands used in combination provide an efficient method of rendering with two or more GPUs.

A better understanding of the nature and advantages of the present invention may be gained with reference to the following detailed description and the accompanying drawings.

BRIEF DESCRIPTION OF THE DRAWINGS

FIG. 4 is a table showing commands and data received by two GPUs from a command buffer, and the corresponding action taken by each of the GPUs according to an embodiment of the present invention;

FIG. 6A illustrates an image rendered by two processors operating in a split-frame rendering mode, while

FIG. 8A illustrates a division of processing workload between two processors in a graphics system using alternate-frame rendering, while FIG. 8B illustrates a division of processing workload between "N" processors in a graphics system using alternate-frame rendering;

FIG. 10A illustrates data flow in a GPU when geometry pulling is turned off, while FIG. 10B illustrates data flow in a GPU when geometry pulling is turned on.

DESCRIPTION OF EXEMPLARY EMBODIMENTS

Figure 1:
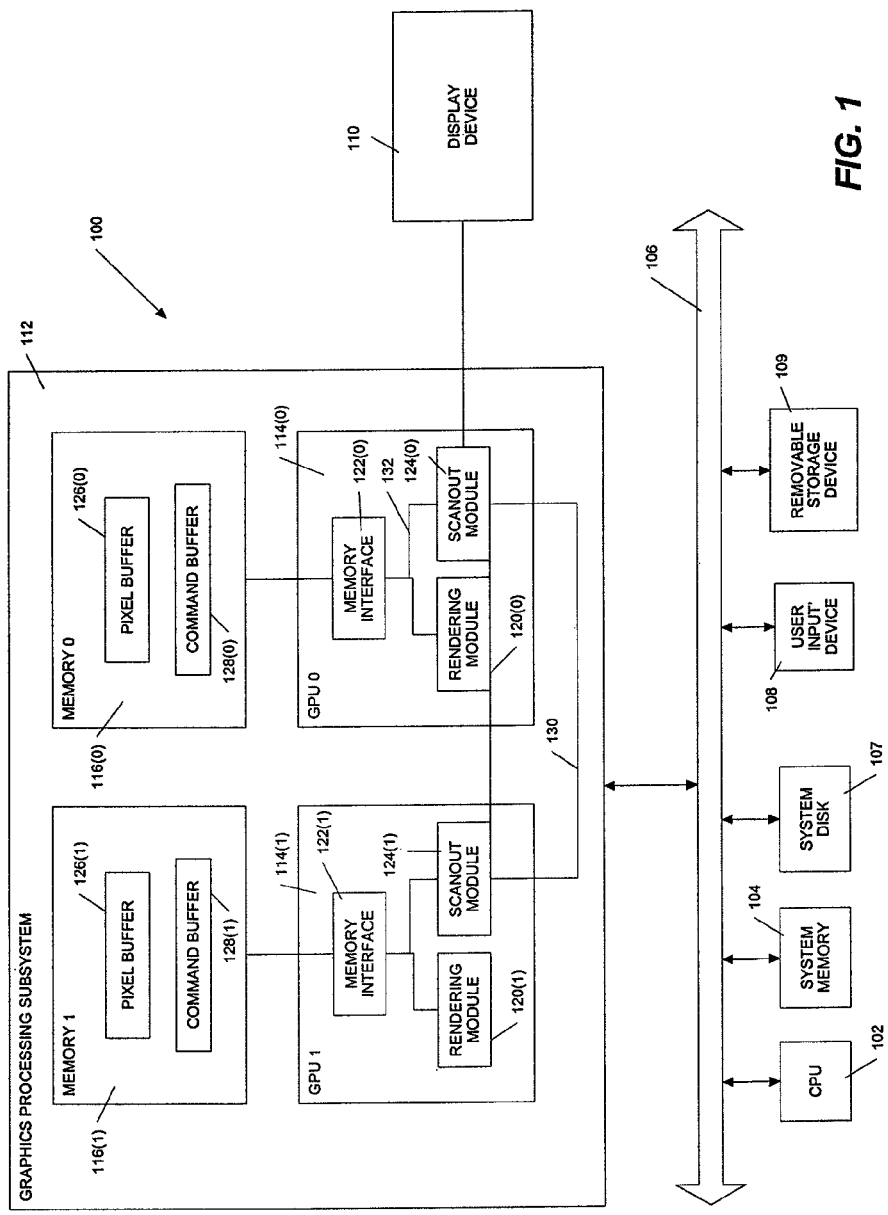
FIG. 1 is a block diagram of a computer system according to an embodiment of the present invention.

FIG. 1 is a block diagram of a computer system 100 according to an embodiment of the present invention. This figure, as with the other included figures, is shown for illustrative purposes only, and does not limit either the possible embodiments of the present invention or the claims.

Computer system 100 includes a central processing unit (CPU) 102 and a system memory 104 communicating via a bus 106. User input is received from one or more user input devices 108, such as a keyboard or mouse, coupled to bus 106. Visual output is provided on a display device 110 such as a conventional CRT or LCD based monitor, operating under control of a graphics processing subsystem 112 coupled to system bus 106. A system disk 107 and other components, such as one or more removable storage devices 109 (e.g., floppy disk drive, compact disk (CD) drive, and/or DVD drive), may also be coupled to system bus 106.

Graphics processing subsystem 112 includes two or more graphics processing units 114, each with its own graphics memory 116, though in other embodiments these memories can be shared. GPUs 114 and memories 116 may be implemented using one or more integrated circuit devices such as programmable processors, application specific integrated circuits (ASICs), and memory devices. In one embodiment, graphics processing subsystem 112 is implemented using one or more expansion cards adapted to be connected to an appropriate bus slot (e.g., PCI-E) on a motherboard of system 100.

Each of GPUs 114 includes a rendering module 120, a memory interface module 122, and a scanout module 124. Rendering modules 120 may be configured to perform various tasks related to generating pixel data from graphics data supplied via system bus 106, interacting with respective graphics memories 116 to store and update pixel data, and the like. Rendering modules 120 generate pixel data from 2-D or 3-D scene data provided by various programs executing on CPU 102.

Memory interface modules 122, which communicate with respective rendering modules 120 and scanout modules 124, manage interactions with respective graphics memories 116. Each memory interface module 122 may also include pathways for writing pixel data received from system bus 106 to the respective graphics memory 116 without processing by rendering module 120.

Graphics memories 116 may be implemented using one or more integrated circuit memory devices of generally conventional design. The graphics processing subsystem may include any amount of dedicated graphics memory 116 (some implementations may have no dedicated graphics memory) and may use system memory and dedicated graphics memory 116 in any combination, and may each contain various physical or logical subdivisions, such as a pixel buffer 126 and a command buffer 128. Each pixel buffer 126 stores pixel data for an image (or for a part of an image) that is read and processed by the respective scanout module 124 and transmitted to display device 110 for display. This pixel data may be generated from 2-D or 3-D scene data provided to rendering modules 120 of GPUs 114 via system bus 106 or by various processes executing on CPU 102 and provided to one or more of pixel buffers 126 via system bus 106. Pixel buffers 126 are advantageously each double buffered so that while data for a first image is being read for display from a front frame buffer, data for a second image can be written to a back frame buffer without affecting the currently displayed image.

Command buffers 128 are used to queue commands received via system bus 106 for execution by respective rendering modules 120 and/or scanout modules 124, as described below. Other portions of graphics memories 116 may be used to store data required by GPUs 114, such as texture data, color lookup tables, executable program code for GPUs 114, and so on.

Scanout modules 124 read pixel color data from pixel buffers 126 and transfer the data to display device 110 to be displayed. In one embodiment, scanout modules 124 operate isochronously, scanning out frames of pixel data at a prescribed refresh rate (e.g., 80 Hz) regardless of any other activity that may be occurring in GPUs 114 or elsewhere in system 100. In some embodiments, the prescribed refresh rate can be a user selectable parameter, and the scanout order may be varied as appropriate to the display format (e.g., interlaced or progressive scan).

It will be appreciated by one skilled in the art that the system described is illustrative and that variations modifications are possible. A GPU may be implemented as one or more integrated circuit devices, and different GPUs of a multi-processor graphics system might or might not be identical in structure, capabilities, and operation. Any or all of the GPUs or other components may be mounted on an expansion card, mounted directly on a system motherboard, or integrated into a system chipset component (e.g., into the Northbridge chip of one commonly used PC system architecture, or a more advanced Integrated Graphics Processor (IGP) type device available from NVIDIA Corporation of San Jose, Calif.). Graphics processing subsystems can be implemented using one or more expansion cards adapted for various bus standards, including PCI, PCI-E, AGP, and so on. In one embodiment, all of the GPUs are mounted on one expansion card. In another embodiment, different GPUs are mounted on different interconnected expansion cards. The cards may be interconnected using a system bus (e.g., PCI-E), or a special card-to-card connector may be provided.

Also, while in this and the other figures, the processors are shown as being graphics processing units or GPUs, other types of processors may be used. For example, general purpose processors may be used. Other types of processors, for example processors having generalized and specialized processing paths may be used. For example, processors including a non-specific processing circuit and processing circuit that is specialized for graphics application may be used. Also, general purpose processors or other types of processors can be used. These processors may be combined in any appropriate manner.

Interconnection between the GPUs may also be modified. For instance, a bridge unit might be provided to interconnect GPUs. A bridge unit, which can be in a separate chip or integrated with one of the GPUs, receives incoming data from system bus 106 and distributes it appropriately (e.g., to all GPUs or to those GPUs identified by a sub-device mask). Another bridge unit might be provided to manage selection among candidate pixels during scanout.

Graphics processing subsystems embodying the present invention may be incorporated into a variety of devices, including general purpose computer systems, video game consoles and other special purpose computer systems, DVD players, handheld devices such as mobile phones or personal digital assistants, and so on.

Figure 2:
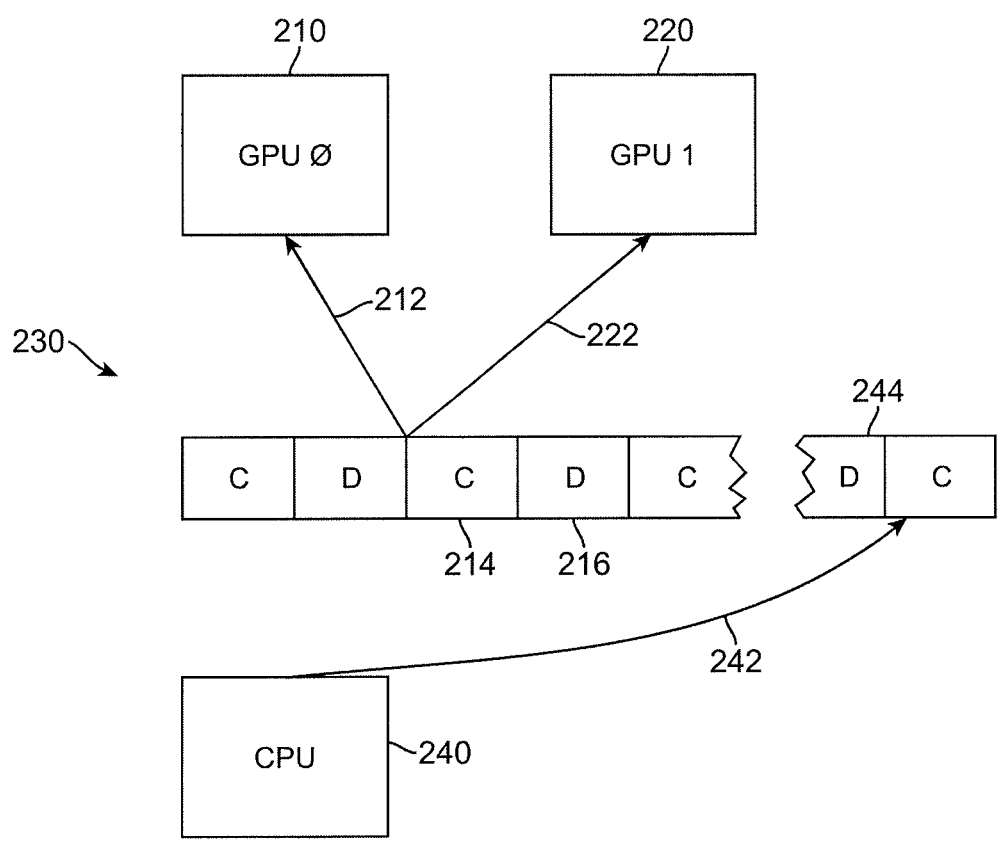
FIG. 2 illustrates a system for communicating rendering commands from a central processing unit (CPU) to multiple graphics processing units (GPUs) according to an embodiment of the present invention.

FIG. 2 illustrates a system for communicating rendering commands from a central processing unit (CPU) 240 to two graphics processing units (GPUs) 210 and 220 that may be improved by incorporating an embodiment of the present invention. In this embodiment, the CPU 240 and GPUs 210 and 220 communicate asynchronously through a command buffer 230. Command buffer 230 is stored in memory accessible to both the CPU 240 and the GPUs 210 and 220. In an embodiment, the command buffer 230 is stored in the computer system's general memory, such as the system memory 104 in FIG. 1, and is accessible to the GPUs 210 and 220 via direct memory access (DMA) transfers. In this example, one command buffer is shown for simplicity, though each GPU may access a separate command buffer in other embodiments of the present invention. The command buffer 230 may also be referred to as a push buffer.

Command buffer 230 stores sets of rendering commands, such as rendering command 214, and sets of rendering data, such as rendering data 216. In one embodiment, a rendering command is associated with rendering data. The rendering command defines the set of rendering processes to be performed by the GPU on an associated rendering data. In a further embodiment, the rendering data is stored in the command buffer 215 adjacent to the corresponding rendering command.

The CPU 240 writes rendering commands and data sets to the command buffer 230. The command buffer 230 can include a number of rendering commands and data sets. The CPU 240 writes commands and data sets into the command buffer 230 at the location determined by "put" pointer 242. Following each CPU 240 write into the command buffer 230, the CPU 240 increments the put pointer 242 to the next unused location in the command buffer 230. In an embodiment, a driver software program executed by the CPU 240 translates high-level rendering commands from a rendering application into commands and data sets, which are then written into the command buffer 230. In a further embodiment, the driver software program receives high-level rendering commands via an application programming interface, for example DirectX™ or OpenGL™.

The GPUs 210 and 220 read commands and data sets from the command buffer 230 at a location determined by "get" pointers 212 and 222. Following each GPU read from the command buffer 230, the GPUs 210 and 220 increment the get pointers 212 and 222 to the location of the next command or data set in the command buffer 230. In one embodiment, each GPU has a separate get pointer which is incremented, in other embodiments this pointer is shared, and only one GPU increments the get counter following a GPU read.

The CPU 240 and GPUs 210 and 220 can access the command buffer independently. In an embodiment, the CPU 240 periodically adds new commands and data sets to the command buffer 230. Simultaneously, the GPUs 210 and 220 read processes commands and data sets previously stored by the CPU 240. Provided the CPU 240 stays ahead of the GPUs 210 and 220, the GPUs 210 and 220 are able to render images without waiting for the CPU 240. In an embodiment, the CPU 240 writes commands and data sets for frames several frames ahead of the frame being rendered by the GPUs 210 and 220.

In an embodiment, the command buffer is limited in size. As an example, a typical command buffer is five megabytes in size. When either the get pointers 212 and 222 or put pointer 242 reaches the end of the command buffer 230, the pointer is reset to the location of the beginning of the command buffer 230. In this manner, the command buffer 230 "wraps around," enabling the CPU 240 and GPUs 210 and 220 to access the command buffer 230 in a continuous loop.

In order to make full use of both GPUs 210 and 220, it is desirable that each GPU render a unique set of geometries. The less overlap there is in their rendering workload, the higher the efficiency of each GPU. Accordingly, it is desirable that each GPU 210 and 220 receive a unique set of geometries and corresponding rendering commands.

But this division of rendering commands has limited practicality and requires a great deal of overhead complexity to achieve. Some rendering commands contain information that is needed by all the GPUs in a system. For example, a rendering command may contain state information regarding a change in the point of view (referred to as camera position), current color or texture, current shader program, or the like. If these updates are not received by each GPU, the image may degrade in a quite striking manner. For example, if a change in camera position is not received by each GPU, the point of view for images or image portions rendered by different GPUs will vary, leading to unfortunate results. Accordingly, an embodiment of the present invention provides for rendering commands to be received by each GPU in a system, while eliminating or reducing unneeded or redundant rendering and 3-D pipeline tasks. An outline for one method of achieving this is shown below.

FIGS. 3A-3D show command and data transactions between a command buffer and two GPUs according to an embodiment of the present invention. These figures include a command buffer 300 and two graphics processing units, GPU0 310 and GPU1 320. For simplicity, two GPUs are shown in this example, though other embodiments of the present invention may include other numbers of graphics processing units. For example, an embodiment of the present invention may include four or eight graphics processing units. The graphics processing units may be general purpose processing units. Alternately, these may be highly sophisticated graphics processing units of the type designed and manufactured by NVIDIA Corporation of Santa Clara, Calif. In other embodiments, these may be general purpose graphics processing units, or other types of graphics processors.

The command buffer 300 is shown in this example as storing a number of commands. These commands and associated data are typically provided to the command buffer 300 by a central processing unit (not shown). The central processing unit stores commands and data in the command buffer and are later read by the GPUs 310 and 320.

A set-subsystem device mask command, SSDM 330, is received by the GPUs 310 and 320. In this example, the format of the command is SSMD 10, where the leading one indicates that the following command or commands are directed towards GPU1 320, and the trailing zero indicates that GPU0 310 is to ignore the following command or commands. Specifically, in various embodiments, a zero may be used to mask one or more commands from a GPU. A zero may mask only the next command from a GPU, it may mask some number of commands, or it may mask all subsequent commands until another SSDM command instructs otherwise.

In this example, the following command is an instruction 340 to turn geometry pulling off. Since GPU1 320 was instructed to receive this command, GPU1 320 will pull geometries. Since GPU0 310 was instructed to ignore this command, GPU0 310 does not change state with respect to geometry pulling: that is, if it was pulling geometries before, it remains in that state, if it was not pulling geometries, it will continue to not pull geometries until instructed to act otherwise.

Figure 3A:
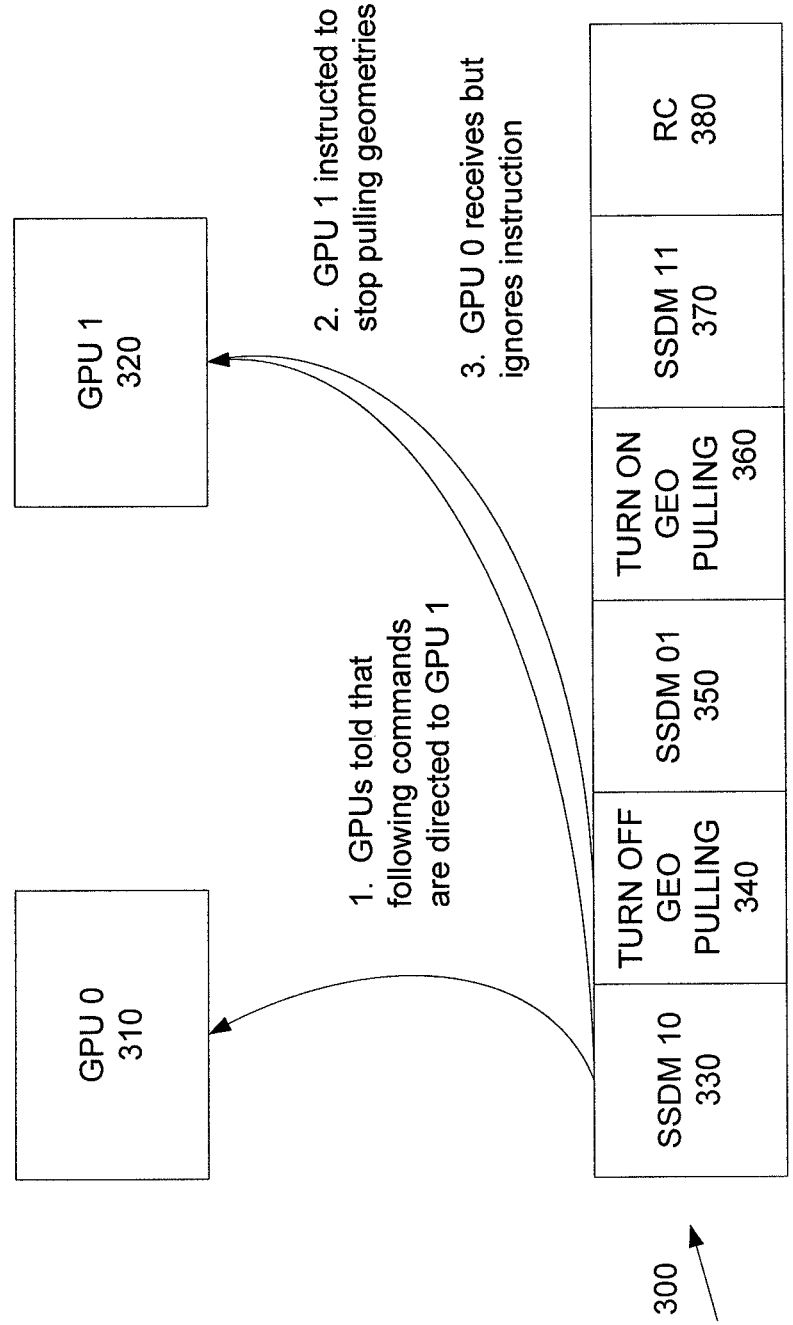
FIGS. 3A-3D show command and data transactions between a command buffer and two GPUs according to an embodiment of the present invention.
Figure 3B:
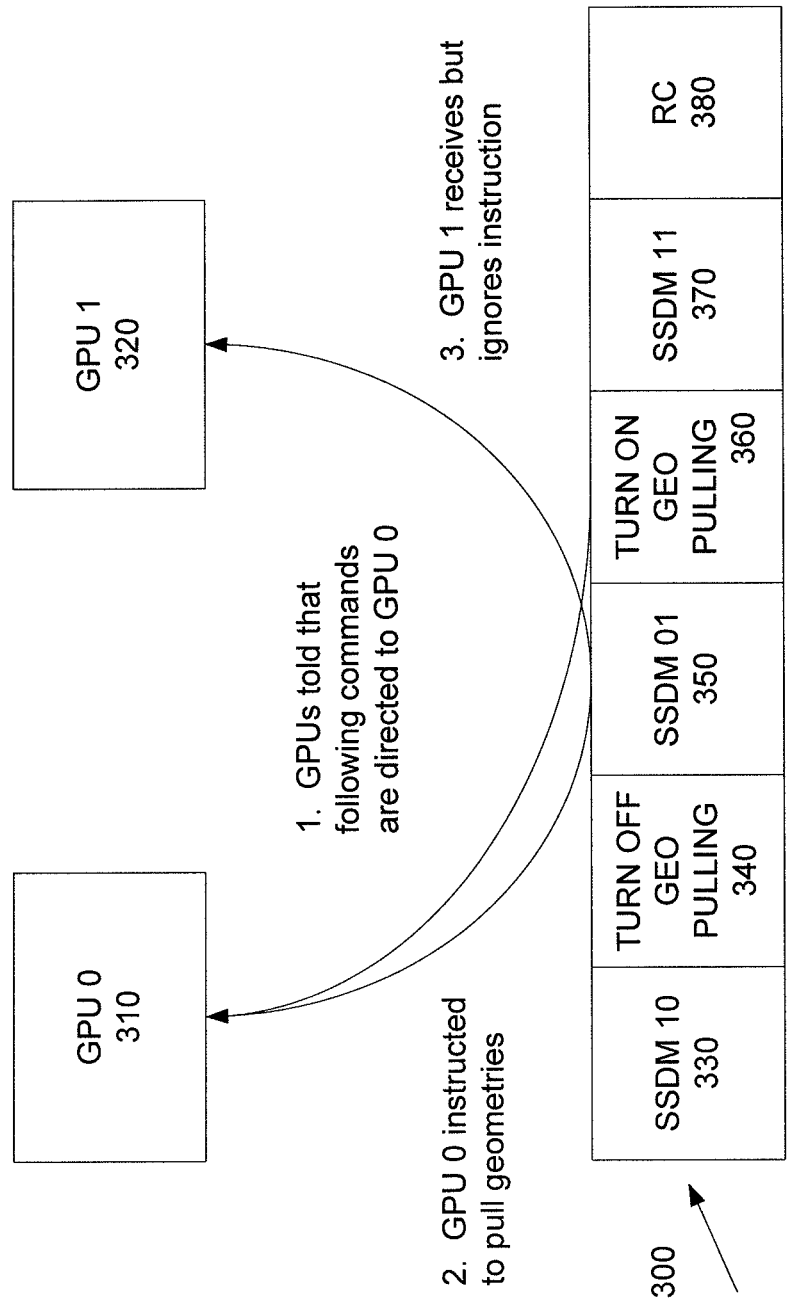

In FIG. 3B a second set-subsystem device mask command SSDM 350 is received from the command or push buffer 300 by the graphics processing units GPU0 310 and GPU1 320. Again, the GPUs receive this command asynchronously, that is, each GPU may receive this command at the same or at different times. The SSDM 01 350 command instructs GPU0 310 that it is to execute the following command or commands. The SSDM 01 2350 command also instructs GPU1 320 to ignore or not execute the following command or commands.

That is, the SSDM 01 350 command masks the following command or commands from GPU1 320.

In this example, the following command is an instruction 360 to turn geometry pulling on. Since GPU0 310 was instructed to receive this command, GPU0 310 will pull geometries. Since GPU1 320 was instructed to ignore this command, GPU1 320 does not change state with respect to geometry pulling. In this particular case, since it was previously instructed to stop geometry pulling, it remains in that state.

Whether a GPU has been instructed to start or stop pulling geometries, the GPU retrieves geometries called for by received rendering commands. These geometries are typically retrieved by the individual GPUs from a frame buffer or graphics memory. When a GPU is in the geometry-pulling mode, the geometries are processed by the GPU, for example by rendering engines and graphics pipelines. When a GPU is in the stop pulling mode, the geometries are not passed to the rendering engines and graphics pipeline.

Figure 3C:
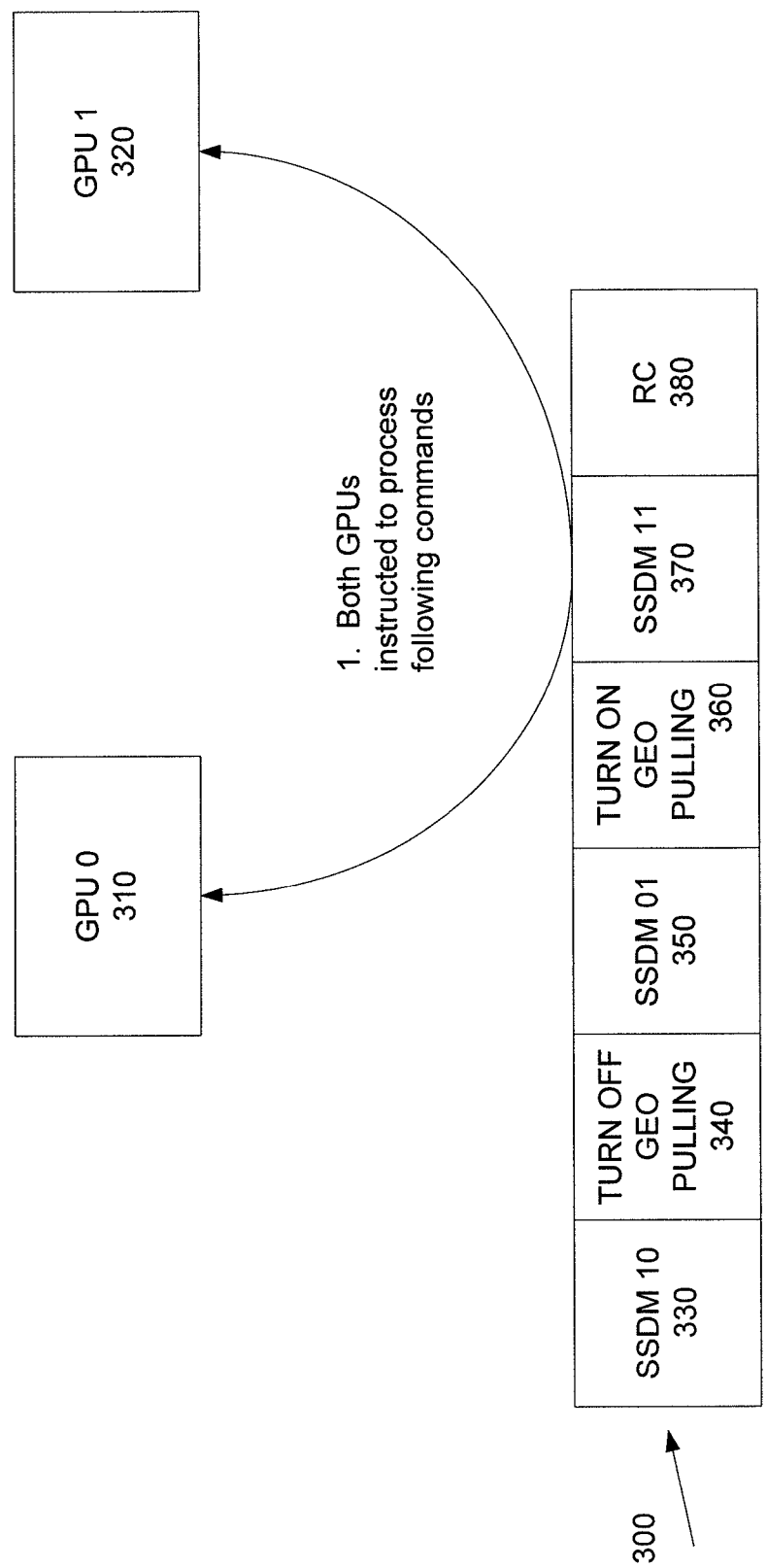

In FIG. 3C, a set-subsystem device mask command SSDM 370 is received by the GPUs from the push buffers. Again, for simplicity, the GPUs are shown as receiving the SSDM 370 command at the same time, though in various embodiments the GPUs may read from the push buffer 300 asynchronously. This SSDM has a mask 11, indicating that both GPUs are to execute the following command or commands.

Figure 3D:
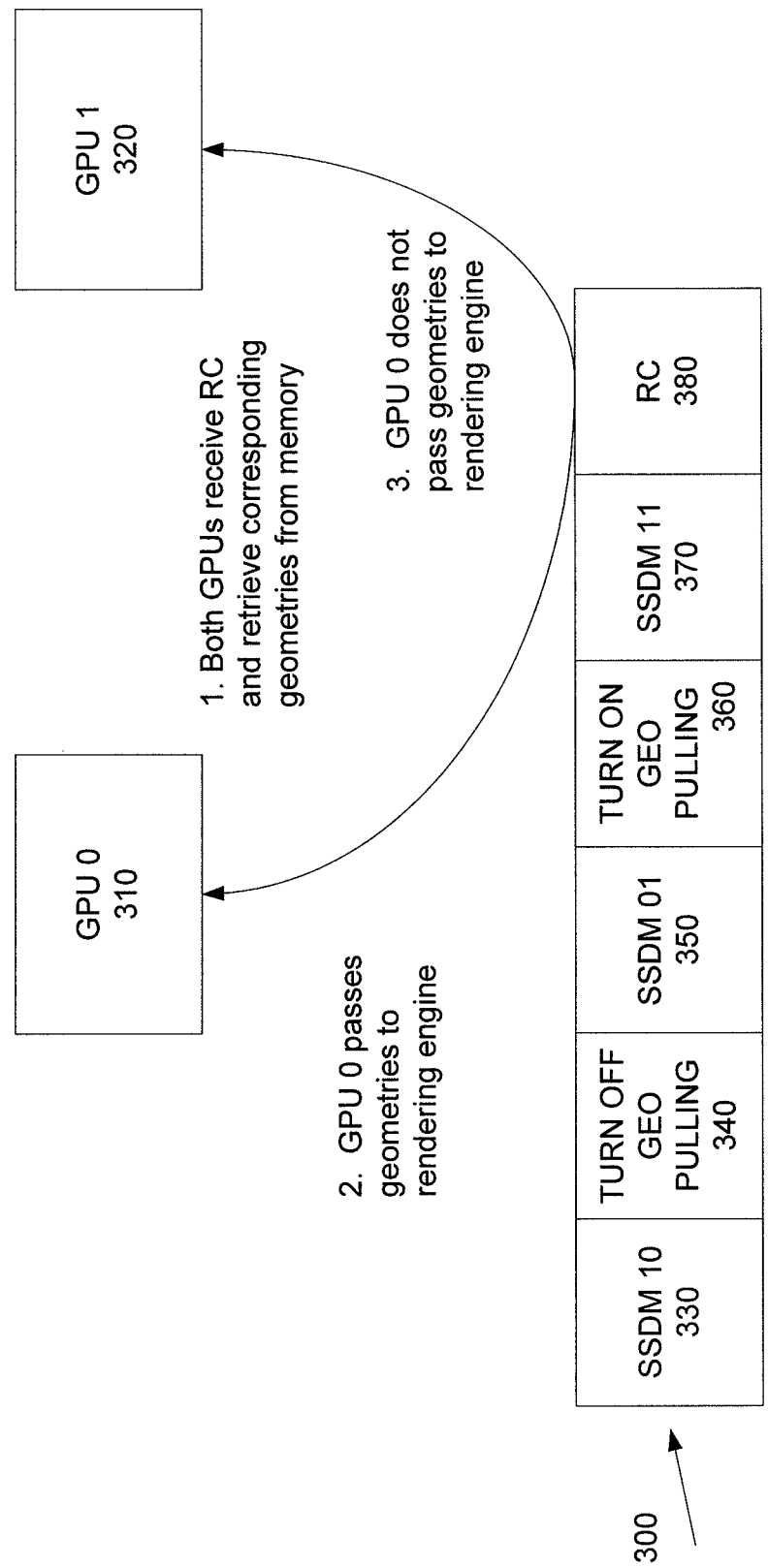

In FIG. 3D, both GPU0 310 and GPU1 320 receive rendering command 380 from the push buffer 300. GPU0 310 is in the geometry pulling mode, so it retrieves geometries called by the rendering command 380 and passes them to its rendering engine and pipeline. GPU1 is in the stop geometry pulling mode, so it retrieves geometries called by the rendering command 380 but does not pass them to its rendering engine and pipeline.

It will be appreciated by one skilled in the art that other variations are possible. For example, if an SSDM command only effects the next instruction, the SSDM 370 instruction would not be required. This and other variations may be made consistent with embodiments of the present invention.

FIG. 4 is a table showing commands and data received by two GPUs from a command buffer, and the corresponding action taken by each of the GPUs according to an embodiment of the present invention. In line 400, an SSDM command is received. The mask value for this command is 10, indicating GPU0 is to ignore the following commands, while GPU1 is to process the following commands. The following command on line 410 is an instruction to turn geometry pulling off. Accordingly, GPU0 ignores this command, while GPU1 turns geometry pulling off.

A second SSDM command is received in line 420. This has a mask value of 01, which instructs GPU0 to execute the following commands and further instructs GPU1 to ignore the following commands. The following command on line 430 is an instruction to turn on geometry pulling. Accordingly, GPU1 ignores this command, while GPU0 turns geometry pulling on.

Line 450 is a further SSDM command. This command has a mask value 11, indicating that both GPU0 and GPU1 are to execute the following command. In this example, the following commands are rendering commands 460. Accordingly, GPU 0 receives geometries that are needed by or called for in the rendering commands, and passes them to the rendering engine and graphics pipeline. Conversely, GPU 1 receives the geometries called for in the rendering commands, but does not pass them to the rendering engine and graphics pipeline.

Figure 5:
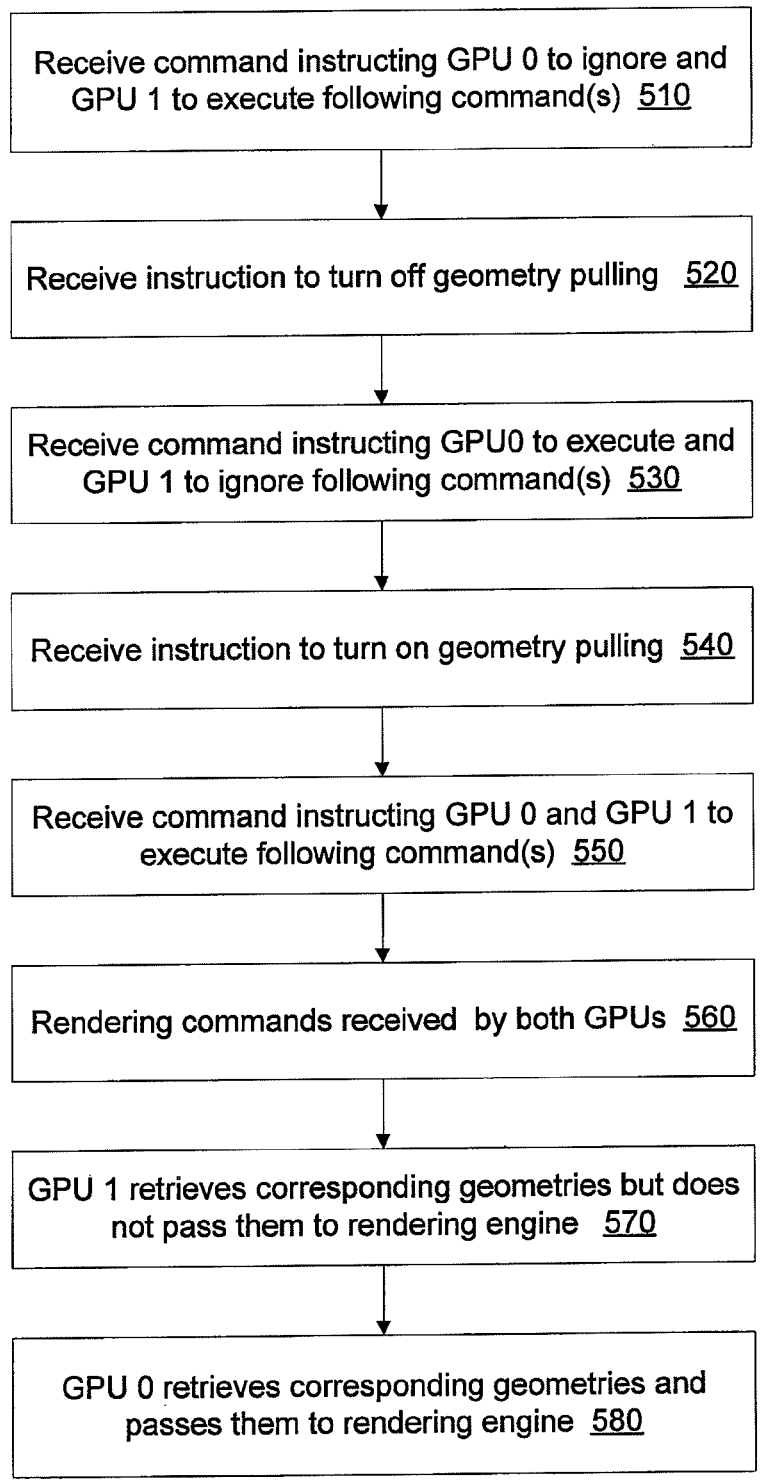
FIG. 5 is a flowchart illustrating a method of processing data and commands from a command buffer according to an embodiment of the present invention.

FIG. 5 is a flowchart illustrating a method of processing data and commands from a command buffer according to an embodiment of the present invention. In this example, two GPUs, GPU0 and GPU1, each receive a series of commands and instructions. While two GPUs are shown in the above and other examples, these embodiments may be extended to a larger number of GPUs.

A command instructing the GPU0 to ignore one or more following commands is received in act 510. An instruction to turn off geometry pulling is received in act 520. Accordingly, GPU1 will turn off geometry pulling, while GPU0 ignores this command and its geometry pulling status remains unchanged.

A command instructing CPU1 to ignore one or more subsequent commands is received in act 530. An instruction to turn on geometry pulling is received by the GPUs in act 540. Accordingly, GPU1 enters the geometry pulling mode, while the status of GPU0 remains unchanged. Specifically, since GPU0 was instructed in act 520 to turn off geometry pulling, and instructed in act 530 to ignore the instruction in act 540 to turn on geometry pulling, GPU0 remains in the geometry pulling "off" mode. Again, each GPU may receive commands either synchronously or asynchronously, though for clarity, it is assumed that each GPU receives instructions synchronously.

An instruction directing both GPUs to execute the following commands is received in act 550. Rendering commands are received by both GPUs in act 560. Accordingly, in act 570, GPU0 retrieves the geometries called for by the received rendering commands, but does not send them to the rendering engine or graphics pipeline. However, in act 580, GPU1 retrieves the corresponding geometry and does pass them to the rendering engine and graphics pipeline. In this way, each GPU can be instructed to either render or not render various geometries, while both GPUs receive any geometries needed for state updates.

In a multi-chip system, the processing burden may be divided among the GPUs in various ways. In the split-frame rendering mode, multiple GPUs 114 operate in parallel to render different portions of an image for display device 110. Each GPU renders pixel data for a different portion of the displayable image, such as a number of lines of a raster-based display. The image portions may correspond to horizontal bands, vertical bands, or other divisions as desired.

Ideally, the display area (or screen) is partitioned in such a way that each GPU requires an equal amount of time to render its portion of the image. If the rendering times are unequal, a GPU that finishes its portion of the frame first will be idle, wasting valuable computational resources. In general, simply partitioning the display area equally among the GPUs is not an optimal solution because the rendering complexity of different parts of an image can vary widely. For example, in a typical scene from a video game, the foreground characters and/or vehicles—which are often complex objects rendered from a large number of primitives—tend to appear near the bottom of the image, while the top portion of the image is often occupied by a relatively static background that can be rendered from relatively few primitives and texture maps. When such an image is split into top and bottom halves, the GPU that renders the top half will generally complete its portion of the image, then wait for the other GPU to finish. To avoid this idle time, it is desirable to divide the display area unequally, with the top portion being larger than the bottom portion. In general, the optimal division depends on the particular scene being rendered and may vary over time even within a single video game or other graphics application.

Figure 6A:
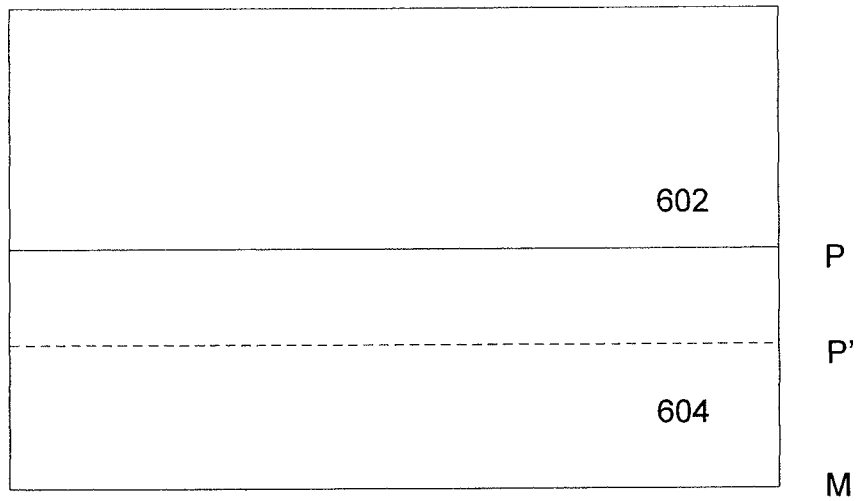

FIG. 6A illustrates an image rendered by two graphics processors operating in a split-frame rendering mode. A display area 600 consists of M lines or horizontal rows of pixel data. Lines 1 through P, corresponding to top portion 602 of display area 600, are rendered by GPU 114(0) of FIG. 1, while lines P+1 through M, corresponding to bottom portion 604 of display area 600, are rendered by GPU 114(1). The area rendered by one GPU is referred to as a clip rectangle.

In one embodiment of the present invention, each GPU provides feedback data to the graphics driver program, or other program executing on CPU 102. The feedback data provides information about the time taken by a particular GPU to render its portion of the image. The graphics driver program uses this feedback to dynamically balance the load among the GPUs by modifying the clip rectangle from time to time, that is, by changing the dividing line to a different line P', based on the relative processing load and rendering completion time of the two GPUs.

Figure 6B:
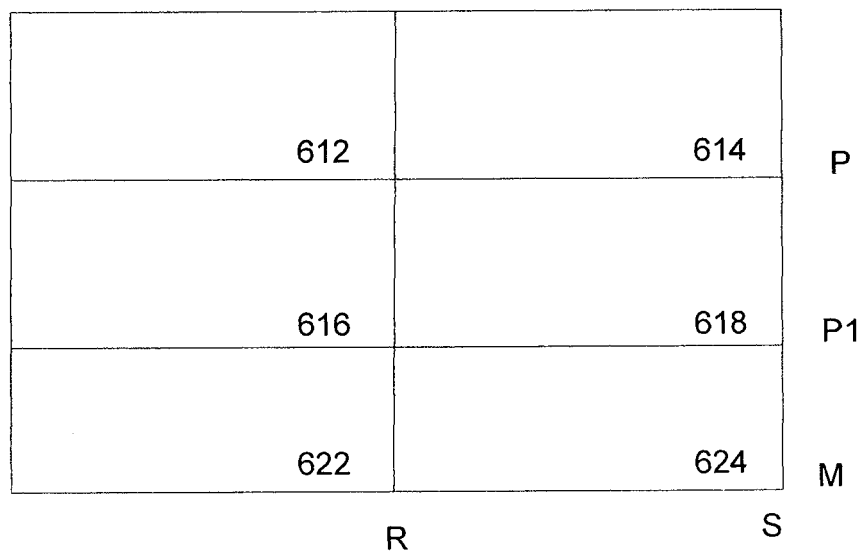
FIG. 6B illustrates an image rendered by "N" processors operating in a split-frame rendering mode.

FIG. 6B illustrates an image rendered by "N" graphics processors operating in a split-frame rendering mode. Again, a display area 610 consists of M lines or horizontal rows of pixel data, where each row is N pixels in length. In this example, the first R pixels in the first P rows (612) are rendered by one GPU, while pixels R+1 though S in the first P rows (614) are rendered by a second GPU. Similarly, display areas 616, 618, 622, and 624 are rendered by other GPUs. In other embodiments, the display area 600 may be split only horizontally. In other embodiments of the present invention, the number of vertical and horizontal divisions may vary from no divisions to any number N divisions. Some or all of these divisions or boundaries may be varied to properly balance the computational load among the GPUs.

Figure 7:
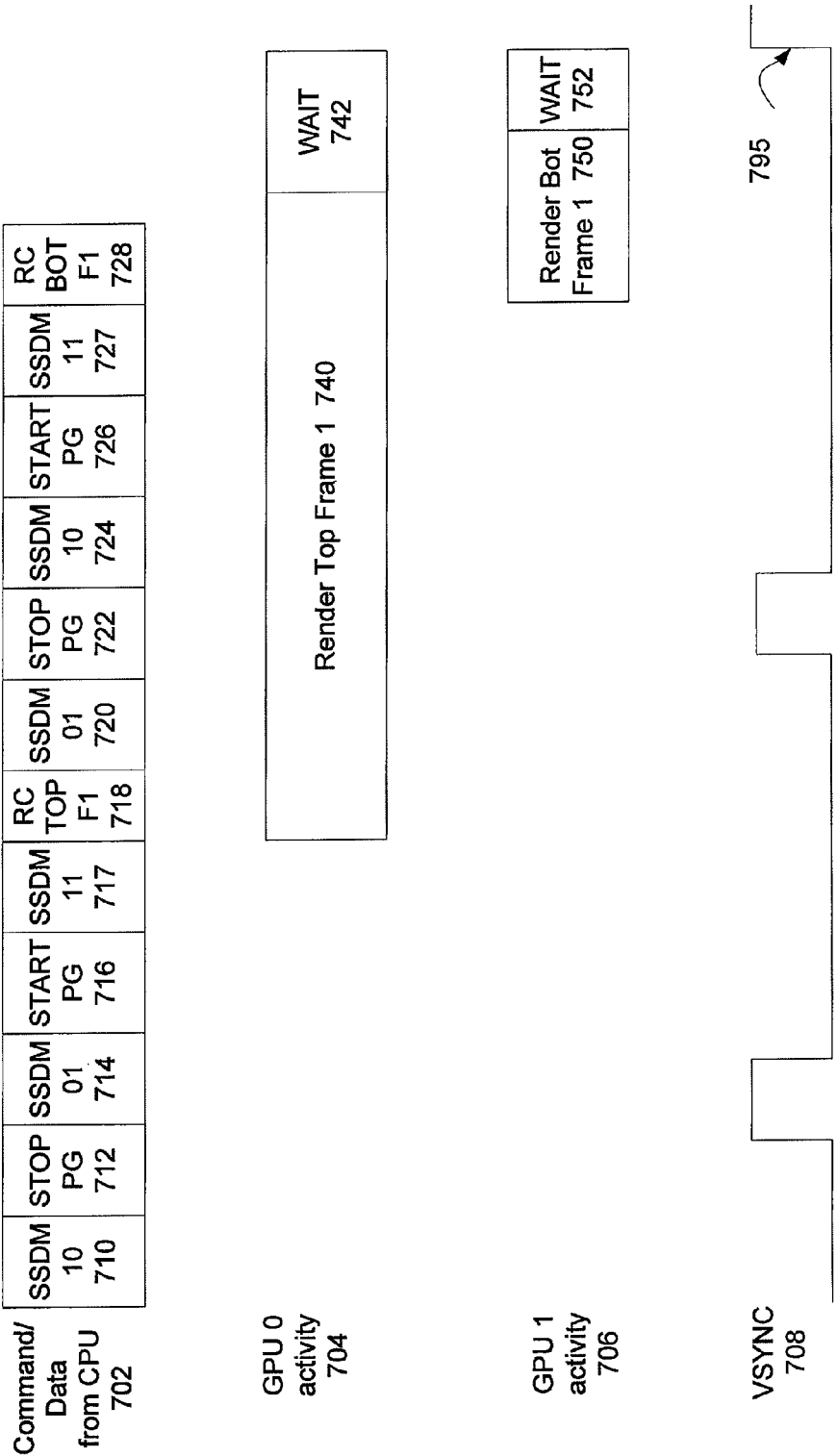
FIG. 7 is a timing diagram illustrating the operation of a graphics system consistent with an embodiment of the present invention operating in a split-frame rendering mode.

FIG. 7 is a timing diagram illustrating the operation of a graphics system consistent with an embodiment of the present invention operating in a split-frame rendering mode. This timing diagram includes commands and data received from a CPU 702, GPU0 activity 704, GPU1 activity 706, and a vertical synchronizing signal VSYNC 708.

An SSDM command 710 is received. This command has mask 10, indicating that the next command is for GPU1 and not for GPU0. This is followed by a stop pulling geometry command 712, setting GPU1 in the stop pulling geometry mode.

An SSDM command 714 is received next. This command has mask 01, indicating that the next command is for GPU0 and not for GPU1. This is followed by a start pulling geometry command 716, setting GPU0 in the start pulling geometry mode, but leaving GPU1 in the geometry pulling off or stopped mode.

An SSDM command 717 with a 11 mask, instructing both geometries to execute the following commands is received. Afterward, rendering commands for the top of the frame F1 are received. These rendering commands typically include rendering commands for geometries that are in the top portion of the frame, as well as those that straddle the borderline between the top and bottom portions of the frame. At this point, GPU0 can begin to render the top of the frame, shown here as time 740.

The previous sequence can now be implemented in reverse such that GPU1 renders the bottom portion of the frame, specifically, those geometries that are in the bottom portion of the frame, as well as those that straddle the borderline between the top and bottom portions of the frame.

Specifically, an SSDM command 720 having a mask value of 01 is received, followed by a stop pulling geometries command 722. Accordingly, GPU0 enters the stop pulling geometries state. Subsequently, an SSDM command 724 having a mask value of 10 is received, followed by a start pulling geometries command 726. Accordingly, GPU1 enters the start pulling geometries state.

An SSDM command 727 with a 11 mask, instructing both geometries to execute the following commands is received. Afterward, rendering commands for the bottom of the frame F1 are received. These rendering commands typically include rendering commands for geometries that are in the bottom portion of the frame, as well as those that straddle the borderline between the top and bottom portions of the frame. GPU1 then renders the bottom of the frame, shown here as time 750.

In this way, two types of commands are used in combination to provide an efficient method of rendering a frame with two or more GPUs. Specifically, a first type of command is used to turn on or off geometry pulling. Turning off geometry pulling allows a GPU to receive state update information contained in a rendering command and associated geometry, while saving the capacity of its rendering engine and pipeline by not passing geometries to them unnecessarily. The second type of command, the SSDM, directs the various GPUs to ignore or execute commands, allowing the status of geometry pulling for each GPU to be controlled on individual basis.

It should be noted that this drawing is not to scale. For example, the time to render the top of frame 1 780 and bottom of frame 1 790 are approximately equal, in a typical embodiment of the present invention. Further details regarding the timing of the rendering of these frame portions (and for the rendering of successive frames as in the examples below) can be found in co-pending U.S. patent application Ser. No. 11/153,931, titled "GRAPHICAL REPRESENTATION OF LOAD BALANCING AND OVERLAP," by Franck R. Diard, which is incorporated by reference.

While in this example the rendering commands for the top and bottom of the frame are shown as being received as groups for simplicity, in various embodiments of the present invention they may be intermixed with the GPUs being instructed to turn on and turn off rendering several times each frame. Further, rendering commands associated with geometries that straddle the borderline between the top and bottom of a frame may be preceded by an SSDM having a mask value of 11, such that both GPUs render those geometries.

Again, in the above example, frames are rendered using the technique known as split-frame rendering. A second processing workload sharing technique is referred to as alternate-frame rendering (AFR). In this technique, frames to be displayed are rendered sequentially by different graphics processing units. For example, where two GPUs are used, alternating frames are rendered by each GPU, with one GPU rendering odd-numbered frames, the other rendering even-numbered frames. In AFR operation, there is no load balancing to be done, since the processing load on each GPU is set by the frame to be rendered.

Different systems that may benefit by embodiments of the present invention may employ AFR while others may use SFR. Further, some systems may alternate or switch between AFT and SFR depending on the application that is running at any one time.

FIG. 8A illustrates the division of processing workload in a two GPU graphics system using alternate-frame rendering. This figure includes a series of frames 810, 820, 830, and 840. Alternating frames are rendered by different GPUs. Specifically, GPU0 renders frames 810 and 830, while GPU1 renders frames 820 and 840.

FIG. 8B illustrates the division of processing workload when "N" GPUs are used in alternate frame-rendering. This figure includes a series of frames 850, 860, 870, and 880. Successive frames are rendered by different GPUs. Specifically, GPU0 renders frames 850 and 880, while GPU1 renders frame 860, and GPU(n−1) renders frame 870. An example of the timing used to render frames in alternate-frame where two GPUs are used is shown in the next figure.

Figure 9:
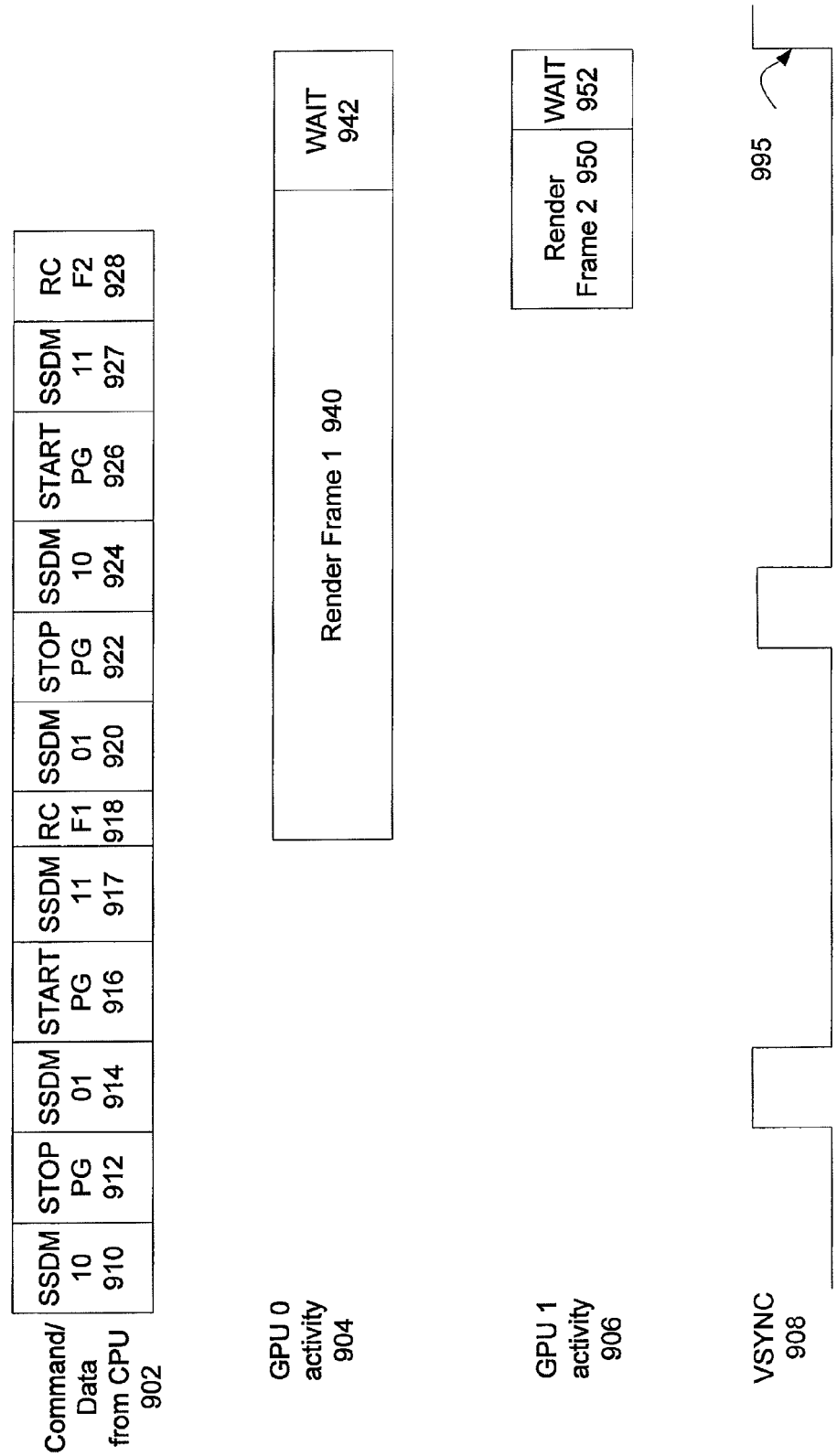
FIG. 9 is a timing diagram illustrating the operation of a graphics system consistent with an embodiment of the present invention operating in an alternate-frame rendering mode.

FIG. 9 is a timing diagram illustrating the operation of a graphics system consistent with an embodiment of the present invention operating in an alternate-frame rendering mode. As before, a sequence of commands is used to turn off the geometry pulling for GPU1 and turn on geometry pulling for GPU0. Specifically, an SSDM command 910 having a mask the value 10 is received. This is followed by a stop geometry pulling command 912. Subsequently, a second SSDM command 914 having a mask value 01 is received, followed by a start geometry pulling command 916. An SSDM command 917 having a mask value 11 is received, followed by rendering commands 918 for frame 1. As the frame 1 rendering commands 918 are received, GPU0 renders frame 1 during time 940.

Subsequently, a sequence of commands is used to turn off geometry pulling for GPU0 and turn on geometry pulling for GPU1. Specifically, an SSDM command 920 having a mask value 01 is received. This is followed by a stop geometry pulling command 922. A second SSDM command 924 having a mask value 10 is received, followed by a start geometry pulling command 926. An SSDM command 927 having a mask value 11 is received, followed by rendering commands 928 for frame 2. As the frame 2 rendering commands 928 are received, GPU0 renders frame 2 during time 950.

Again, in this way, two types of commands are used in combination to provide an efficient method of rendering a frame with two or more GPUs. The first type of command is used to turn on or off geometry pulling. Turning off geometry pulling allows a GPU to receive state update information contained in rendering commands and associated geometries, while saving the capacity of its rendering engine and pipeline by not passing geometries to them unnecessarily. The second type of command, the SSDM, directs the various GPUs to ignore or execute commands, allowing the status of geometry pulling for each GPU to be controlled on individual basis.

Figure 10A:
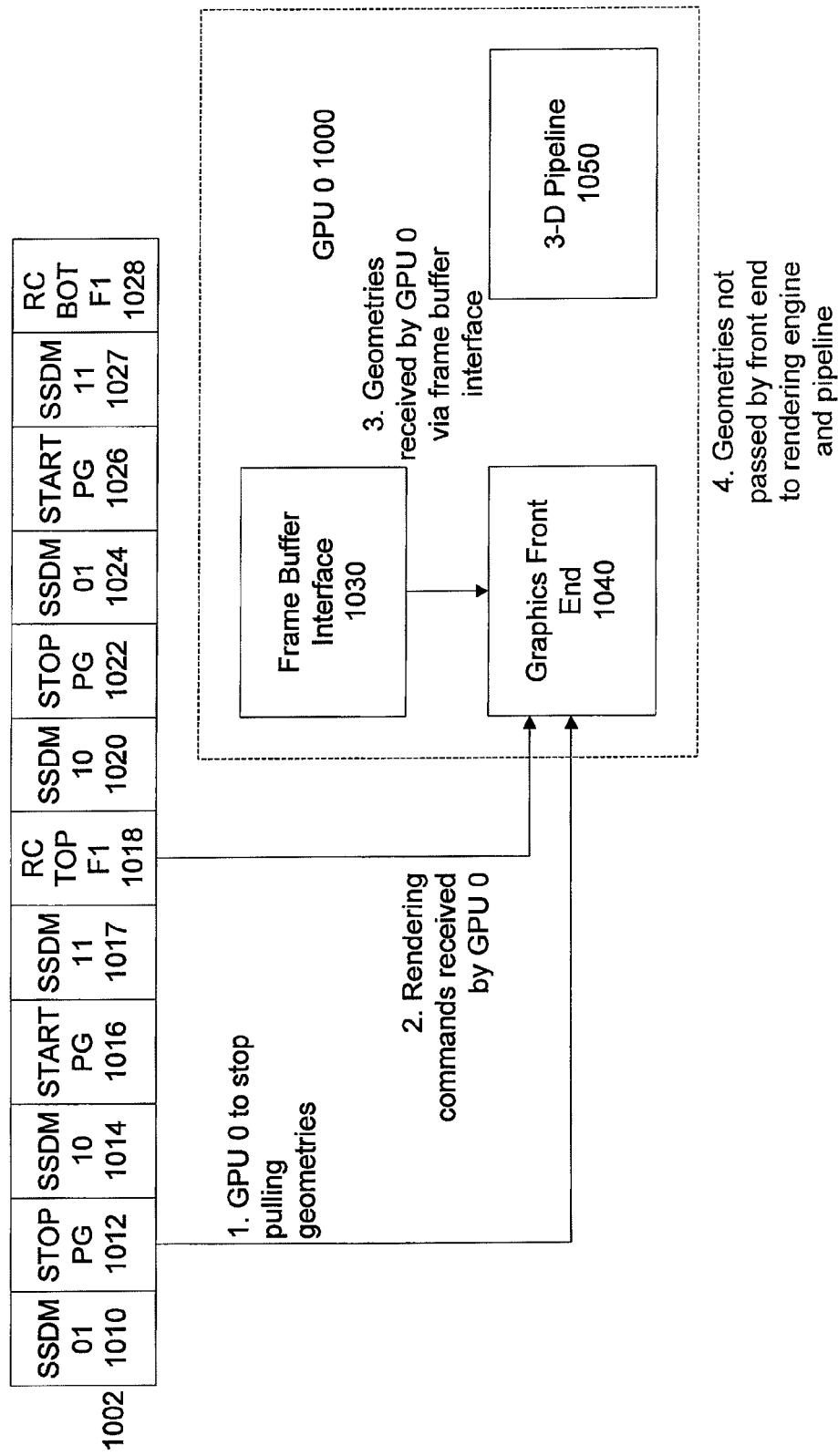

FIG. 10A illustrates data flow in a GPU when geometry pulling is turned off. Included is a push buffer 1002 and GPU0 1000, including a frame buffer interface 1030, graphics front-end 1040, and 3-D pipeline 1050. In this example, GPU0 1000 is instructed to stop pulling geometries. Rendering commands are then received by GPU0 1000. Associated geometries are received from a graphics memory (not shown) via the frame buffer interface 1030, but not passed by the front end 1040 to the 3-D pipeline 1050 and rendering engine.

Figure 10B:
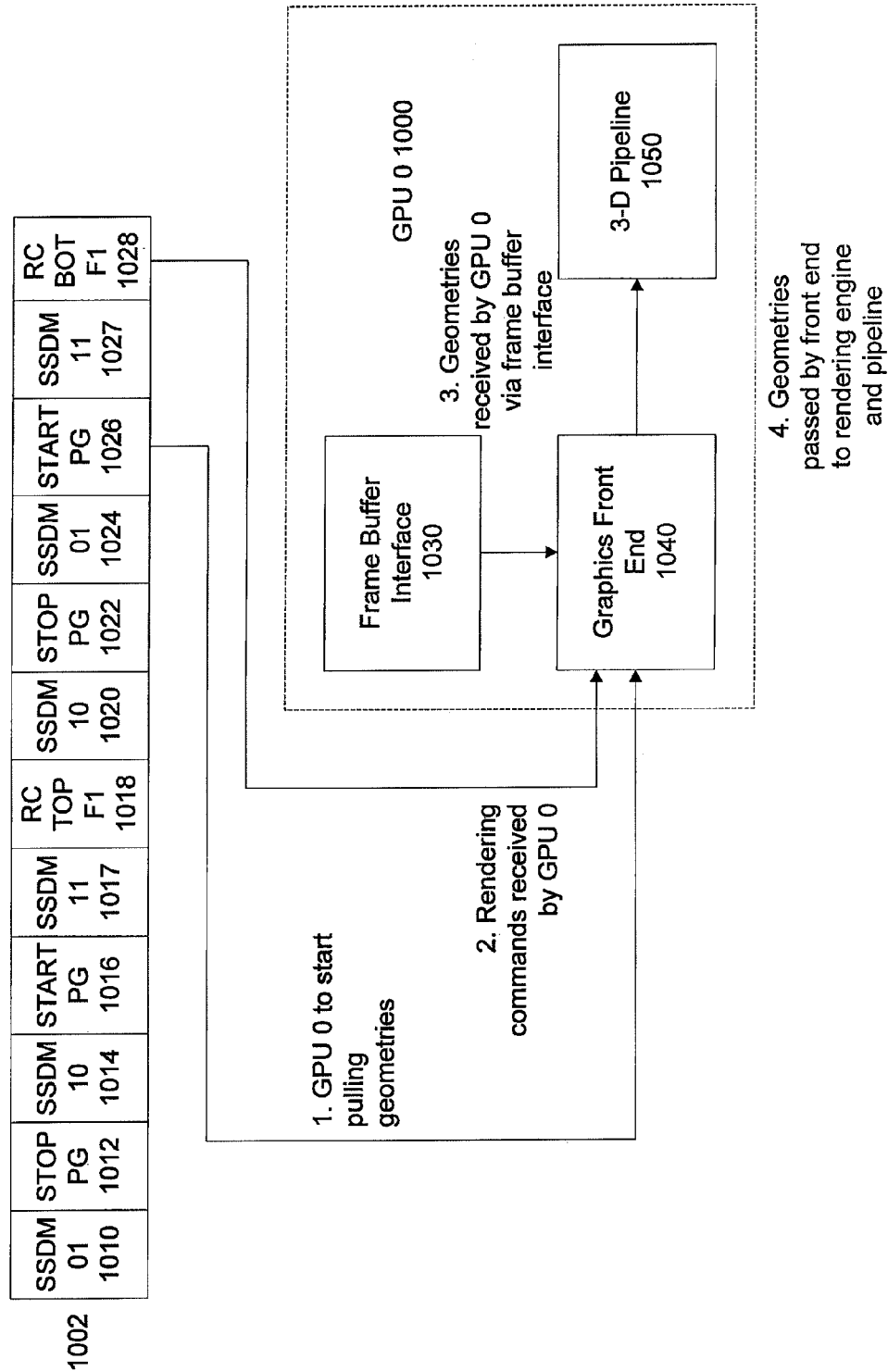

FIG. 10B illustrates data flow in a GPU when geometry pulling is turned on. In this example, GPU0 1000 is instructed to start pulling geometries. Rendering commands are then received by GPU0 1000. Associated geometries are received from a graphics memory (not shown) via the frame buffer interface 1030, and are passed by the front end 1040 to the 3-D pipeline 1050 and rendering engine. As before, the stop and start geometry pulling allows GPUs to avoid rendering geometries unnecessarily while still receiving state updates, and the SSDM commands allow the stop and start geometry pulling commands to be specifically directed to target GPUs.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of rendering a graphical image comprising:
with a central processing unit, providing commands to processors including a first and a second processor:
providing a first device mask command instructing the first processor to execute one or more first commands following the first device mask command, and further instructing the second processor to not execute the one or more first commands following the first device mask command;
providing the one or more first commands to the processors, the one or more first commands comprising a command instructing the processors to turn geometry pulling off;
providing the second device mask command instructing the second processor to execute one or more second commands following the second device mask command, and further instructing the first processor to not execute the one or more second commands following the second device mask command;
providing the one or more second commands to the processors, the one or more second commands including a command instructing the processors to turn geometry pulling on;
providing the third device mask command instructing the first processor to execute one or more third commands following the third device mask command and further instructing the second processor to execute the one or more third commands following the third device mask command; and
providing the one or more third commands to the processors, the one or more third commands comprising a rendering command,
wherein the first processor executes the one or more first commands after the first device mask command and before the second device mask command, then ignores the one or more second commands after the second device mask command and before the third device mask command, and
wherein the second processor ignores the one or more first commands after the first device mask command and before the second device mask command, then executes the one or more second commands after the second device mask command and before the third device mask command.

2. The method of claim 1 further comprising:
executing the rendering command with the second processor by retrieving a geometry and passing the geometry to a rendering engine in the second processor.

3. The method of claim 1 wherein the first processor and the second processor are graphics processing units.

4. The method of claim 1 wherein the rendering command includes a state update.

5. The method of claim 4 wherein the state update includes color information.

6. A method of rendering a graphical image comprising:
using a first command to instruct a first processor in a multi-processor system to execute one or more subsequent commands and to instruct a second processor in the multi-processor system to not execute the one or more subsequent commands; and then
using a second command in the one or more subsequent commands to instruct the first and second processor to turn geometry pulling on, where the second command is executed by the first processor and the second command is not executed by the second processor; and then issuing a third command subsequent to the one or more commands that causes the second processor to begin executing commands again.

7. The method of claim 6 further comprising:
rendering a first plurality of geometries with a first plurality of rendering commands using the first processor.

8. The method of claim 7 further comprising:
receiving the first plurality of geometries with the second processor, but not rendering the first plurality of geometries with the second processor.

9. The method of claim 7 wherein the first plurality of geometries are received from a graphics memory.

10. The method of claim 7 wherein the first processor and the second processor are graphics processing units.

11. The method of claim 7 wherein the first and second pluralities of rendering commands include state updates.

12. An integrated circuit comprising:
a graphics front-end;
a graphics pipeline coupled to the graphics front-end; and
a frame buffer interface coupled to the graphics front-end;
wherein the graphics front-end is configured to retrieve geometries using the frame buffer interface, the graphics front-end is further configured to selectively pass or not pass the geometries to the graphics pipeline, and the graphics front-end is further configured to receive an instruction to either execute or not execute commands until receiving a corresponding second instruction either to stop executing commands or to start executing commands again.

13. The integrated circuit of claim 12 wherein the graphics front-end passes or not pass the geometries to the graphics pipeline under control of a command received by the graphics front-end.

14. The integrated circuit of claim 13 wherein the geometries are retrieved from a graphics memory.

15. The integrated circuit of claim 14 wherein the geometries are retrieved in response to received rendering commands.

16. The integrated circuit of claim 14 wherein the rendering commands include state updates.

17. The integrated circuit of claim 14 wherein the integrated circuit is a graphics processing unit.

\* \* \* \* \*